Feb. 28, 1956 A. J. SORENSEN 2,736,882
CIRCUIT INTEGRITY CHECKING SYSTEM
Filed July 18, 1952 3 Sheets-Sheet 2
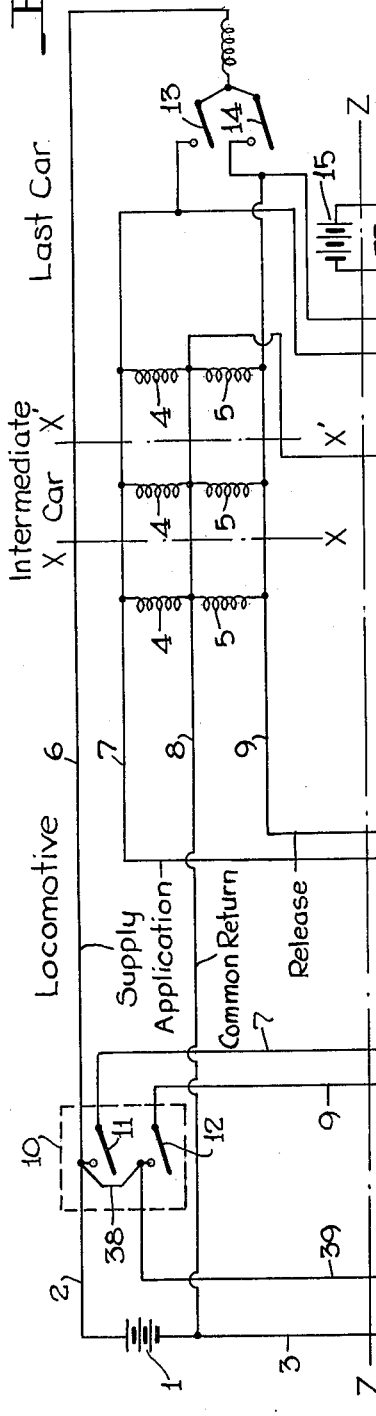
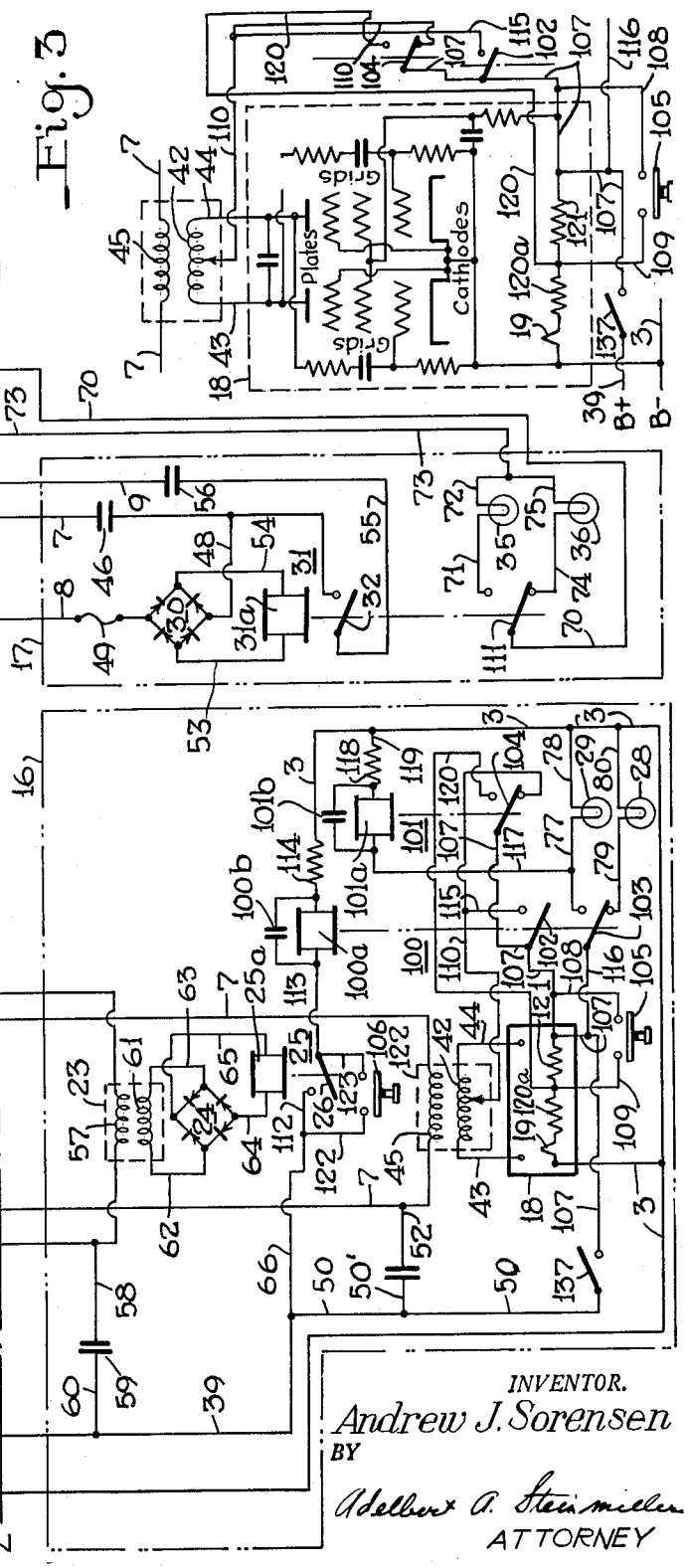
INVENTOR.
Andrew J. Sorensen
BY
Adelbert A. Steinmiller
ATTORNEY

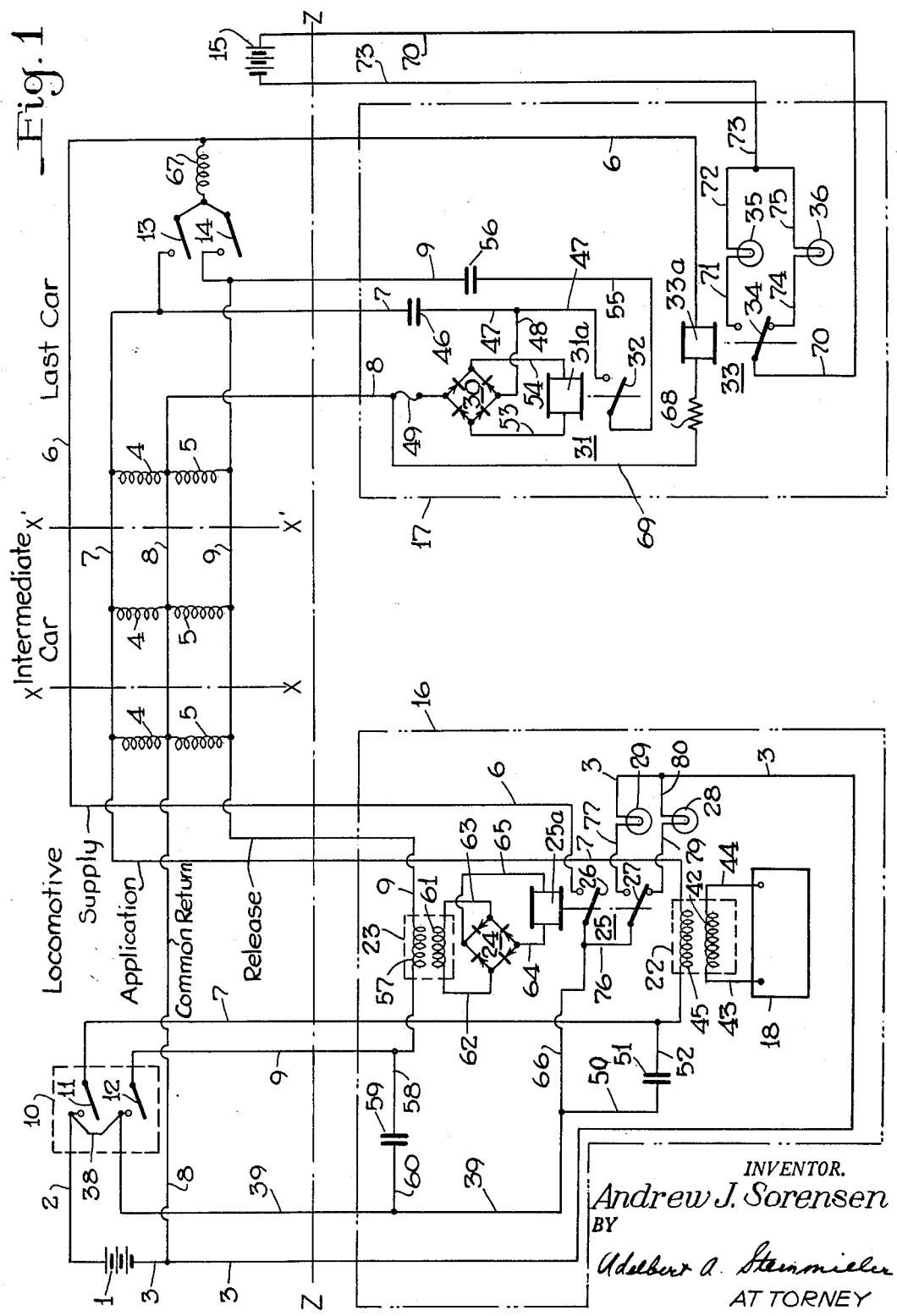

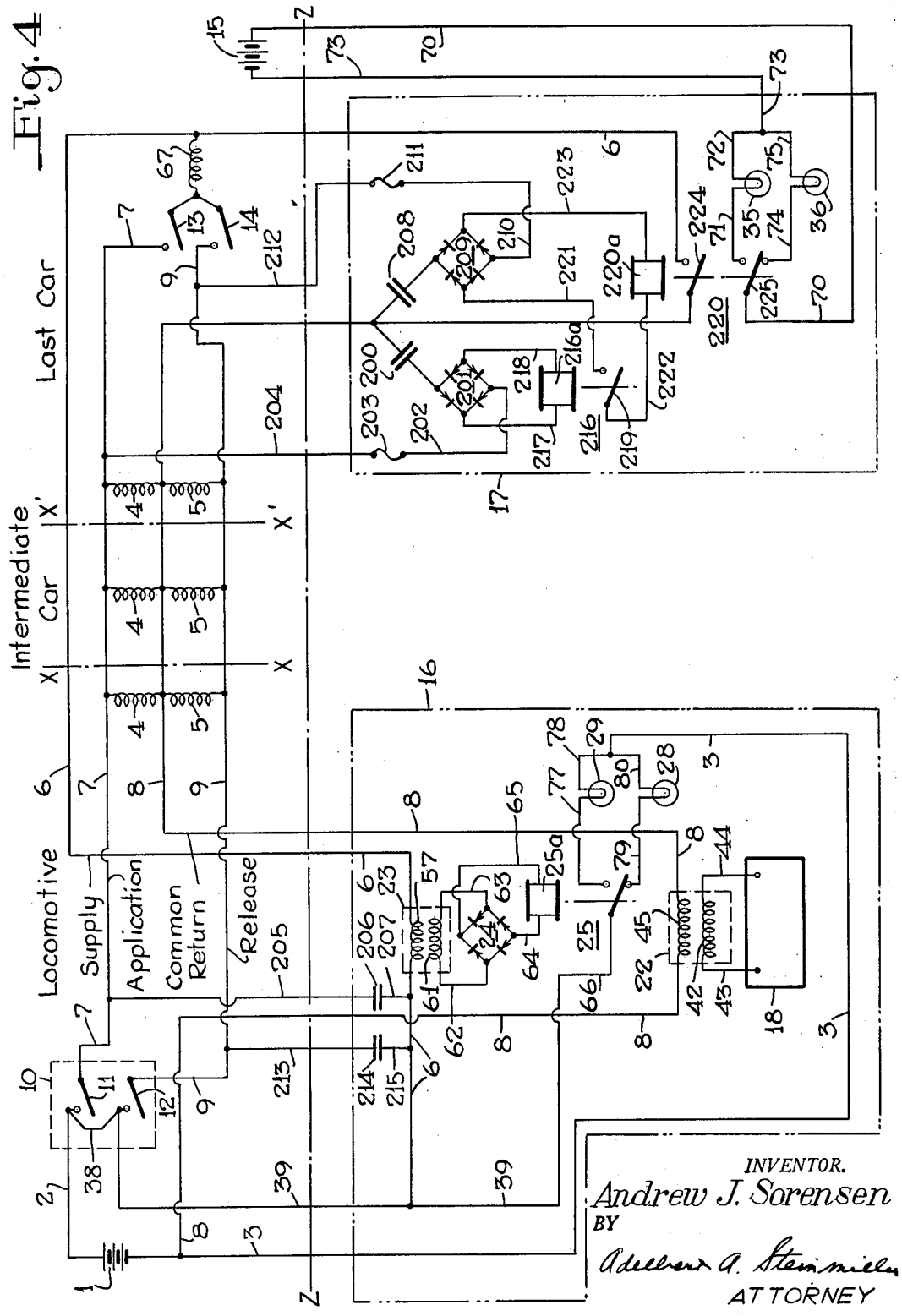

United States Patent Office 2,736,882
Patented Feb. 28, 1956

2,736,882

CIRCUIT INTEGRITY CHECKING SYSTEM

Andrew J. Sorensen, Edgewood, Pa., assignor to Westinghouse Air Brake Company, Wilmerding, Pa., a corporation of Pennsylvania Application July 18, 1952, Serial No. 299,632

19 Claims. (Cl. 340—213)

This invention relates to a circuit checking means, and more particularly, to an apparatus adapted to be associated with the control circuits of an electro-pneumatic brake apparatus employed on a train of cars to signal the integrity or lack of integrity of the said control circuits or other electrical devices associated therewith.

The desirability of continuously indicating the integrity or lack of integrity of the electrical control circuits and of the magnet valve windings in electro-pneumatic brake control systems on railroad trains has been apparent for some time, and various means and methods have been proposed and employed for this purpose. One such means and method are described in United States Patent No. 2,573,442 issued October 30, 1951, to C. M. Hines and assigned to the assignee of the present application.

The above mentioned patent disclosed apparatus for checking and signalling the integrity and lack of integrity of electro-pneumatic train brake control circuits, which apparatus comprises two separate and different checking arrangements; one using a direct current source of supply and a Wheatstone bridge arrangement operative while the brakes are released, and the other, a current responsive relay means, operative while the brakes are applied.

It is one object of my invention to provide a simplified and relatively low cost circuit checking apparatus for checking the integrity of a plurality of control circuits.

A further object of my invention is to provide a novel and improved circuit checking apparatus in which the same elements operate for signalling the integrity or lack of integrity of a plurality of control circuits both while said circuits are operatively deenergized and also while said circuits are operatively energized.

A further object of my invention is to provide a novel and improved circuit checking apparatus employing an alternating current of sufficiently high frequency as to be capable of checking and signalling the integrity or lack of integrity of the train brake control circuits, both while the brakes are applied and while the brakes are released, that no interference with the normal brake control circuit in the circuits occurs.

Another object of my invention is to provide an improved and simplified circuit checking apparatus of the type indicated in the foregoing objects and characterized by means for signalling the integrity condition and lack of integrity condition of the circuits at both the head end and the rear end of the train.

The above objects, together with other objects which will be made apparent in the subsequent description of my invention, are attained by apparatus to be hereinafter described when read in connection with the accompanying drawings, wherein Fig. 1 is a diagrammatic view of one form of my invention as applied to a simplified electrical brake control apparatus; Fig. 2 is a diagrammatic view of a modified form of my invention as applied to a simplified brake control apparatus; Fig. 3 is a schematic representation of a high frequency signal generator employed in the circuit checking and signalling system of Fig. 2; and Fig. 4 is a modification of the form of my invention shown in Fig. 1.

Description—Fig. 1

For the purpose of illustrating the nature and utility of the form of my invention shown in this figure, it is shown in the drawings associated with a simplified brake control apparatus including a source of direct current voltage, such as a battery 1, a battery output wire 2 and a battery return wire 3 respectively connected to opposite poles of said source, a plurality of magnet valve devices on each car of the train and on the locomotive, represented in the drawing by the magnet coils 4 and 5 wherein the numeral 4 represents an application magnet valve coil on each car and the numeral 5 represents a release magnet valve coil on each car. It should be noted that a train may comprise a locomotive and any number of cars and hence a corresponding number of magnet coils 4, 5 to be checked, but for purposes of illustration in the drawing, only each of the two coils for the locomotive, an intermediate car, and the rear car of a train are shown, it being understood that all other intermediate cars in a train would be similarly equipped, but the showing thereof is not essential to an understanding of the invention. In the drawing the locomotive and last car of the train are shown separated from the intermediate car by lines X—X, X'—X'.

The brake control apparatus also includes a battery supply wire 6, an application control wire 7, a common return wire 8, and a release control wire 9, all of which extend from the locomotive throughout the train to the last car, and a switch device 10 on the locomotive for completing connections to energize wires 7 and 9 and said mentioned magnet coils; said switch device usually being of the fluid pressure controlled type subject to control by the operator of the train, but, for simplicity, represented in the drawing merely by two switch contacts 11 and 12. As shown in the drawing, on the last car there is provided a back-up switch device having two manually operable control member 13 and 14 and a car battery 15 as a source of electrical energy for operating certain signals hereinafter to be described.

The embodiment of the novel circuit checking and signalling apparatus shown in Fig. 1 may be contained in a suitable casing 16, indicated in the drawing in broken outline, on the locomotive, and a casing 17, also so indicated, on the last car; the casing 16 containing a high frequency generator 18 to generate an alternating checking current of a frequency preferably between 2000 and 4000 cycles per second, said generator being preferably of the electronic type such as shown in Fig. 29(c) on page 509 of the first edition, second impression of Radio Engineers' Handbook by Frederick E. Terman, which for sake of simplification is shown in the drawing in outline with its output terminals indicated; the casing 16 also containing an output transformer 22, a transformer 23, a full-wave rectifier 24, a relay 25 having an operating coil 25a and two contact members 26 and 27, a fault signal lamp 28 and an all-clear lamp 29. The casing 17 on the last car contains a full-wave rectifier 30, a relay 31 having an operating coil 31a and a contact member 32, a relay 33 having an operating coil 33a and a contact member 34, an all-clear lamp 35, and a fault lamp 36.

When the generator 18 is brought into operation by suitable means (not shown), high frequency alternating current is supplied to a primary winding 42 of the transformer 22 by way of wires 43 and 44 connected to the output of the high frequency generator 18, which thereby induces a high frequency voltage in a secondary winding 45 of the transformer 22; the turns ratio of the transformer 22 being selected for the proper impedance match between the generator 18 and the load of the circuit being checked. The high frequency voltage thus induced in the secondary winding 45 of the transformer 22 urges flow of a high frequency current through a first checking circuit which includes in series the application control wire 7 through the train, and, in the casing 17 on the last car in the train, a condenser 46, a wire 47, a wire 48, the rectifier 30, a fuse 49, the common return wire 8 back through the train, the battery return wire 3, the battery 1 on the locomotive, the battery output wire 2, jumper wire 38 in the switch device 10, the battery output wire 39, a wire 50, a condenser 51, and a wire 52 back to the secondary winding 45 of the transformer 22 via wire 7. In this first checking circuit, the high frequency current from generator 18 in passing through the rectifier 30 of the last car is transformed into pulsating direct current for energizing the relay coil 31a to cause relay 31 to pick-up. With relay 31 picked up, the contact member 32 will be caused to assume a closed position, opposite to that in which it is shown in the drawing, thereby completing a second checking circuit in parallel with the first checking circuit just described; said second checking circuit including the secondary winding 45 of the transformer 22 on the locomotive, the application control wire 7 through the train, and, in casing 17 on the last car, the condenser 46 and wire 47, closed contact member 32 of relay 31, a wire 55, and a condenser 56, connected to the release control wire 9, thence back through the train via wire 9 to, on the locomotive, a primary winding 57 of the transformer 23, a wire 58, a condenser 59, a wire 60, the wire 39, wire 50, condenser 51, and wire 52 back to the secondary winding 45 of transformer 22. The completion of this second checking circuit by closure of relay contact member 32 on the last car as just described results in the flow of high frequency current through the primary winding 57 of the transformer 23 of the locomotive which induces an alternating voltage in a secondary winding 61 of the same transformer 23; the turns ratio between primary winding 57 and secondary winding 61 of transformer 23 being a matter of design to match the impedances of the circuits to which these primary and secondary windings are connected. The secondary winding 61 is connected by wires 62, 63, 64, 65 into a locomotive relay control circuit which includes the rectifier 24, and the coil 25a of relay 25. With high frequency voltage generated in the secondary winding 61 of transformer 23, the rectifier 24 receives, in the locomotive relay control circuit, high frequency current via wires 62, 63, and transforms same into pulsating direct current for supply to the relay coil 25a by way of wires 64 and 65, to cause relay 25 to pick-up and thereby cause its contact member 26 to assume a closed position opposite to the open position in which it is shown in the drawing and causes its contact member 27 to assume an upper closed position opposite to a lower closed position in which it is shown in the drawing.

With contact member 26 in its closed position, a last car signal control circuit is completed which includes the battery 1, battery output wire 2, jumper wire 38 in the switch device 10, the wire 39, a wire 66, closed contact member 26, the battery supply wire 6 through the train, and, on the last car, past a choke coil 67 (which prevents high frequency current from entering said circuit when the backup switch device contact members 13 and 14 are closed, as will hereinafter further be explained), a relay coil 33a of relay 33 in the casing 17, a voltage limiting resistor 68, a wire 69, common return wire 8 back through the train to the negative terminal of battery 1 on the locomotive, thereby establishing supply of a direct current to said last car signal control circuit and energizing relay coil 33a in the casing 17 on the last car to cause relay 33 to pick-up. With relay 33 picked-up, the contact member 34 of said relay will be in its upper closed position completing a circuit for energizing the all-clear lamp 35 on the last car extending from the positive terminal of the car battery 15, by way of a wire 70, contact member 34 in its upper closed position, a wire 71, all-clear lamp 35, a wire 72, and a wire 73 connected to the negative terminal of the car battery 15.

On the last car, when relay coil 33a becomes deenergized consequential to opening of the last car signal control circuit, the contact member 34 will drop to its lower closed position in which it is shown in the drawing to complete an alternate circuit for energizing the fault lamp 36 by supply of direct current from the positive terminal of the car battery 15 via the wire 70, contact member 34 in its lower closed position, a wire 74, fault lamp 36, a wire 75 and wire 73 to the negative terminal of the car battery 15.

On the locomotive, with contact member 27 of relay 25 in its upper closed position due to energization of relay 25, as previously described, a circuit is completed for energizing the locomotive all-clear lamp 29 by supply of direct current from the positive terminal of the battery 1, by way of battery output wire 2, jumper wire 38 in the switch device 10, battery output wire 39, wire 66, a wire 76, contact member 27 of relay 25 in its upper closed position, a wire 77, all-clear lamp 29, and a branch of battery return wire 3 to the negative terminal of the battery 1. If relay 25 is deenergized, its contact member 27 will be in its lower closed position completing an alternate circuit for energizing the locomotive fault lamp 28 by supply of direct current from the positive terminal of the battery 1, by way of battery output wire 2, jumper wire 38 of switch device 10, wire 39, wire 66, wire 76, the contact member 27 of relay 25 in its lower closed position, a wire 79, the fault lamp 28, a wire 80, and the battery return wire 3 to the negative terminal of the battery 1.

It should be noted herein that the brakes on the train of cars are controlled by the energization and deenergization of the application and release magnet valve coils 4 and 5 on each car and that energization of the magnet valve coils 4 and 5 is controlled on the locomotive by the contact members 11 and 12 of the switch device 10 such that when the contact members 11 and 12 are closed, the brakes are applied, when only contact 12 is closed, the brakes are held applied, and when both contacts are open, the brakes are released. The operation of switch device 10 to so control energization of the magnet valve coils 4 and 5 throughout the train for controlling brakes on the train is well-known to persons skilled in the art and hence further discussion of same is deemed unnecessary.

*Operation—Fig. 1*

With the circuit checking apparatus conditioned for operation and with no fault existing in the brake control wires 7, 8, 9, both the all-clear lamp 29 on the locomotive and the all-clear lamp 35 on the last car will be illuminated, as above mentioned.

If a fault occurs in the application control wire 7, such as a break anywhere along the train, high frequency current will no longer be delivered to the rectifier 30 on the last car, with consequent termination of flow of direct current from said rectifier to the relay coil 31a, so that contact member 32 will be caused to assume its open position. With contact member 32 of relay 31 open, the high frequency circuit through the release control wire 9 and the primary winding 57 of transformer 23 on the locomotive will be opened. The transformer 23 will therefore cease operation, thus terminating the delivery of high frequency current to the rectifier 24 and stopping the delivery of direct current to the relay coil 25a. The relay 25 will consequently drop out and the contact member 26 of said relay will move to its open position in which it is shown in the drawing, and contact member 27 of said relay will move to its lower closed position in which it also is shown in the drawing. With contact member 27 of relay 25 in its lower closed position, the circuit previously described, for energizing the locomotive all-clear lamp 29 will be opened, and the alternate circuit, previously described, for energizing the fault lamp 28 will be completed. The moving of contact member 26 of relay 25 to its open position interrupts the circuit for impressing direct current voltage on the battery supply wire 6 throughout the train and thereby deenergizes the coil 33a of relay 33 on the last car, thus causing the contact member 34 of said relay to move to its down closed position, thereby opening the circuit, previously described, for energizing the all-clear lamp 35 on the last car, and completing the circuit, previously described, for energizing the fault lamp 36. Thus, a fault such as a break in the application wire will be indicated on the locomotive and on the last car by the extinguishment of the respective all-clear lamps 29, 35, and the lighting of the respective fault lamps 28, 36.

It will be seen from the previous paragraph that if relay 25 on the locomotive is deenergized, the all-clear lamp 29 on the locomotive will be deenergized and the fault lamp 28 energized, and the circuit for energizing relay 33 on the last car will be interrupted, with resultant deenergizing of the all-clear lamp 35 on the last car, and energizing of the fault lamp 36.

It will also be seen that energization of relay 25 is dependent upon the delivery of direct current voltage from rectifier 24 which in turn is dependent upon operation of the transformer 23, in turn dependent upon energization of the second checking circuit previously defined, which includes the release control wire 9 and application control wire 7, by high frequency voltage delivered by transformer 22 on the locomotive.

Further, deenergization of relay 31 on the last car will interrupt the release control checking circuit through wire 9 and energization of said relay is dependent upon the delivery of direct current voltage from rectifier 30 which in turn is dependent upon the completion of the circuit through train wires 7 and 8 for impressing high frequency voltage on said rectifier. Therefore, if the circuit through the application and return wires 7, 8 for impressing high frequency voltage on the rectifier 30 is interrupted, the relay 31 will be deenergized for effecting energization of the fault lamps 28 and 36 and the deenergization of the all-clear lamps 29 and 35 on both the locomotive and last car, respectively. Similarly, if the circuit for energizing the relay 25 is interrupted, the fault lamps 28 and 36 will be energized and the all-clear lamps 29 and 35 deenergized. If only the circuit for energizing relay 33 is interrupted, only the all-clear lamp 35 will be deenergized and the fault lamp 36 energized on the last car, while, on the locomotive, the lamp 29 will remain energized and the fault lamp 28 deenergized.

It will now be apparent that faults such as a break in the application control wire, or in the common return wire 8 or a short-circuit between the application control wire 7 and the common return wire 8 will interrupt the impressing of a high frequency voltage across the rectifier 30, thereby effecting a deenergization of relay 31 which, as previously explained, will cause the deenergization of both the all-clear lamps 29 and 35, and the energization of both the fault lamps 28 and 36, thus indicating such a fault at both ends of the train.

It will also be apparent that faults such as a break in the release control wire 9 or a short-circuit between said release control wire 9 and the common return wire 8 will interrupt the impressing of high frequency voltage on the transformer 23 thereby effecting the deenergization of relay 25 which, as previously explained, will effect deenergization of both all-clear lamps 29 and 35 and the energizing of both fault lamps 28 and 36 on the locomotive and last car of the train to indicate said fault.

If a break in the battery supply wire 6 occurs, the circuit for energizing relay 33 will be interrupted, thus deenergizing relay 33 for effecting deenergization of all-clear lamp 35 and energizing fault lamp 36 on the last car without, however, effect on the lamps 28, 29 on the locomotive. A fault of this type is not so serious however as the previously mentioned possible faults in the brake control wires 7, 8 and 9 due to the fact that only the operation of the back-up switch device is affected. Moreover, on trains not equipped with the back-up switch device (indicated on the drawing by the contact members 13, 14) this fault would never appear, due to the fact that the battery supply wire 6 throughout the train would not be used.

An application of the brakes by operation of the switch device 10 on the locomotive as is common knowledge, will supply direct current from battery 1 to the application and release control wires 7 and 9, by means of the positive terminal wire 2 and switch contact members 11 and 12, to the magnet valve device coils 4 and 5, the common return wire 8, and the negative terminal wire 3 to the battery 1, thereby to energize said coils throughout the train. This direct current will have only a minor effect on the checking circuit equipment however, due to the fact that the condensers 46 and 56 prevent direct current from reaching the rectifier 30, and the transformers 22 and 23 are constructed with sufficient air gap that the said direct current will not saturate said transformers. Therefore, the operation of the circuit checking equipment is independent of the operation of the brake control apparatus.

The train brakes may also be applied by the use of the back-up switch shown in the drawing as comprising contact members 13 and 14. To apply the brakes by this switch, the contact members 13 and 14 are closed for supplying direct current from the battery 1 on the locomotive via the supply wire 6 through the train and the choke coil 67, to the application wire 7 and release wire 9 for distribution to the respective magnet valve coils 4 and 5. The choke coil 67 prevents the high frequency checking current supplied to the control circuits from entering the battery supply wire 6 via contact members 13 and 14 when closed.

It should be noted here that the battery 15 on the last car acts as the source of supply of current for energizing the lamps 35 and 36 on said car and not the battery 1 on the locomotive via supply wire 6. This is done to insure lighting of the fault lamp 36 on the last car in event that there is a fault in the battery supply wire 6 from the locomotive.

If a short circuit occurs in either condenser 46 or 56, it is apparent that an abnormally high direct current voltage will tend to flow through the rectifier 30 and relay 31 to connect application and release wires 7 and 9 to the battery 1 for initiating a brake application upon closure of contacts 11 and 12. In order to avoid damage to these components, the fuse 49 placed in the energizing circuit for rectifier 30 will burn out if the current through said rectifier tends to become excessive, thus opening the circuit for energizing said rectifier and, as previously described, thereby effecting energization of the fault lamps 28 and 36 on the locomotive and last car of the train, respectively.

It will thus be seen that the checking and signalling equipment shown in Fig. 1 provides a simple and inexpensive but adequate means for informing the locomotive engineer and the rear car trainmen of the integrity or lack of integrity of the train brake control circuits over wires 7, 8 and 9, which might seriously affect the control of the brakes throughout the train.

*Description—Fig. 2*

Inasmuch as there is a similarity between Fig. 1 and

Fig. 2, only so much of the equipment shown in Fig. 2 will be described as differs from the equipment shown in Fig. 1, and like parts in the two equipments will be identified by the same reference numerals, while those parts that differ will be identified by the reference numerals beyond the numeral 99 and below the numeral 199.

A fault in the train line brake circuits, above mentioned, might be only of a temporary nature and correct itself in a short period of time, such as fifteen seconds, for example. Therefore, in contrast to the structures shown in Fig. 1 where such a temporary fault would result in a continuous fault indication necessitating, for train safety, the use of the purely pneumatic brakes when the electro-pneumatic brakes could still be used, it might be desirable to delay the cutting out of the circuit checking equipment, in case of such a temporary fault, for a period of time to permit self-correction of the fault, as may often occur, and allow continued use of the electro-pneumatic brakes on the train.

To attain this end, the circuit checking equipment on the locomotive of Fig. 1 may be modified, as shown in Fig. 2, by the addition of two reset switches 105, 106, and two relays 100, 101, provided with condensers 100b and 101b respectively, connected in parallel with coils 100a and 101a of said relays to make same slow releasing (fifteen seconds, for example), the relay 100 controlling two contact members 102, 103 while the relay 101 controls a contact member 104. Either of the reset switches 105 or 106 may be used to start the circuit checking equipment into operation, the only difference between the two switches being the time interval in which said switches effect operation of the generator 18 as will be explained. It should be noted herein that the reset switch 105 merely by-passes a resistor 121 in the filament circuit of the generator as will be explained presently.

Another modification used in the apparatus in Fig. 2 is the elimination of relay 33 and its contact member 34, and the addition of contact member 111 to relay 31 to serve the same purpose as contact 34 in Fig. 1. This specific relay arrangement employing only the relay 31 instead of relays 31 and 33 constitutes no part of the present invention, but is described and claimed in the co-pending application of Claude M. Hines and Everett P. Sexton for Electric Checking Apparatus, filed June 30, 1954, Serial No. 440,352. To bring the equipment in Fig. 2 into operation, a manual switch 137 must first be closed as well as one of the manual reset switches 105 or 106. Assuming the reset switch 105 to be closed, a circuit will be completed from battery 1 for starting the generator 18 by way of the positive terminal wire 2, jumper wire 38 of the switch device 10, wire 39, wire 50, closed switch 137, a branch of wire 107, wire 108, the closed reset switch 105, a wire 109, a heater resistor 120a, a heater 19 of the electronic tube in the generator 18, and the battery return wire 3 back to the battery 1, thus heating said heater for operation of said tube. At the same time the plate supply circuit to said electronic tube (shown in detail in Fig. 3) is completed from the battery supply wire 3 via jumper 38, wire 39 and wire 50 to the plates of the electronic tube via closed switch 137, wire 107, contact member 104 of relay 101 in its down closed position, wire 110 connected to a center tap of the primary winding 42 of transformer 22, and via opposite ends of said winding and the wires 43 and 44 to the respective plates of said tube; the cathodes of said tube being constantly connected to the battery return wire 3 to complete the circuit via the battery 1. With the heater and plate supply circuits thus completed as above described, the generator 18 is brought into operation to supply high frequency voltage to the primary winding 42 of transformer 22. With the primary winding 42 of transformer 22 energized by a high frequency voltage, as was explained in the description of Fig. 1, a high frequency voltage will be impressed on the secondary winding 45, thus impressing a high frequency voltage on a circuit that includes the application wire 7 throughout the train, the condenser 46 in the casing 17 on the last car, wire 47, wire 48, rectifier 30, fuse 49, common return wire 8 throughout the train, battery return wire 3, battery 1, positive terminal wire 2, jumper wire 38 on the switch 10, wire 39, wire 50, wire 50', condenser 51, and wire 52 back to the secondary winding 45 of transformer 22 via wire 7. As this circuit is energized by the high frequency current resultant from impression of voltage thereon, the rectifier 30 supplies direct current to the relay 31 on the last car by way of wires 53 and 54, thereby energizing relay coil 31a to close the contact member 32 of said relay as well as to position an additional contact member 111 of said relay for completing a circuit to energize the all-clear lamp 35, as will be further explained. With contact member 32 of relay 31 in its closed position, a circuit is completed which includes the release control wire 9 and the primary winding 57 of the transformer 23 on the locomotive as was previously described in connection with Fig. 1. The completion of this circuit on which a high frequency voltage is impressed causes the primary winding 57 of the transformer 23 to induce a voltage in the secondary winding 61 of transformer 23 which is connected to the rectifier 24 by wires 62 and 63. With high frequency voltage impressed across the rectifier 24, said rectifier thus supplies direct current to the relay coil 25a by way of wires 64 and 65, thereby causing relay 25 to be energized to its picked-up position in which the single contact member 26 of said relay is picked-up and closed.

With contact member 26 of relay 25 in its closed position, a circuit is completed from the battery 1 for energizing the relay 100 to its picked-up position by way of the positive terminal wire 2, jumper wire 38 of switch 10, wire 39, wire 66, a wire 112, closed contact member 26, a wire 113, relay coil 100a, voltage limiting resistor 114, and the battery return wire 3 back to the battery 1. With relay 100 energized to its picked-up position, a contact member 102 of said relay will be closed, thus providing a parallel generator plate supply circuit including wire 110, a wire 115, contact member 102 and wire 107 connected to battery 1 via switch 137 in its closed position and wires 39 and 50. Also with relay 100 energized and picked-up, a contact member 103 will be in its upper closed position, thus completing a circuit for energizing the all-clear lamp 29 by way of a circuit including battery 1, positive terminal wire 2, jumper wire 38, wire 39, wire 50, closed switch 137, wire 107, a wire 116, contact member 103 in its upper closed position, wire 77, lamp 29 (wire 78, and battery return wire 3 to the battery 1; and also completing a circuit for energizing and picking up relay 101 by way of battery 1, positive terminal wire 2, jumper wire 38 on switch 10, wire 39, wire 50, closed switch 137, wire 107, wire 116, contact member 103 in its upper closed position, wire 77, a wire 117, relay coil 101a, voltage limiting resistor 118, wire 119, and battery return wire 3 to the battery 1. With the relay 101 energized and picked-up, the contact member 104 will be in its upper closed position completing another circuit for heating the heater 19 of the generator electronic tube by way of wire 39, wire 50, closed switch 137, wire 107, contact member 104 in its upper closed position, wire 120, resistor 120a, heater 19 and wire 3 to the negative terminal of the battery 1. As can now be seen, the moving of the contact member 104 to its upper closed position closes a circuit in parallel with that closed by the manual reset 105 which may now be released without effect upon operation of the transformer 22. With all the relays 31, 25, 100 and 101 energized and picked-up as just described, the checking apparatus is in operating condition when no fault exists.

If instead of closing the reset switch 105, the reset switch 106 is closed, the relays 100, 101 will both be energized with the relay 25 deenergized. The reset switch 106 by-passes the contact member 26 of relay 25 by way of wires 122, reset switch 106, and wire 123, thus due to the slow release characteristics of both relays 100, 101, the reset switch 106 may be used instead of reset 105 to start the generator 18 in operation and the reset switch 106 need not be held closed as required by the reset 105, since, although the circuit for energizing relay 100 is opened when the reset 106 is released, the slow release characteristic of said relay permits the generator 18 to start into operation and effect the picking-up of contact member 26 or relay 25 if no fault exists (as was previously described) before the relay 100 has had sufficient time to drop out.

*Operation—Fig. 2*

As was explained above in connection with conditioning the checking equipment for operation with no fault existing, the switch 137 in the casing 16 is closed, and then either the reset switch 106 is closed or the reset switch 105 is held closed for a short time interval, whichever one that is desired to be used, to effect the impressing of high frequency voltage on the application control wire 7 and the common return wire 8 throughout the train to the rectifier 30 on the last car. With high frequency voltage impressed across the rectifier 30, a direct current will energize and pick-up the relay 31 and cause the contact member 32 of said relay to close, thereby completing a circuit including the release control wire 9 throughout the train, and the primary winding 57 of transformer 23 on the locomotive, said circuit also having the high frequency voltage impressed upon it. Also when the relay 31 is energized and picked-up, the contact member 111 of said relay will be in its upper closed position whereby a circuit is completed from the car battery 15 for energizing the all-clear lamp 35 by way of wire 70, contact 111, wire 71, all-clear lamp 35, wire 72 and wire 73, thus giving an indication on the last car of the integrity condition of the control wires. With high frequency voltage impressed on the previously mentioned circuit including the release control wire 9 on the primary winding 57 of transformer 23, a high frequency voltage is induced in the secondary winding 61 of said transformer and thus across the rectifier 24 which in turn supplies direct current voltage to energize and pick-up relay 25 and maintain the contact member 26 of said relay in its closed position. As long as contact member 26 of relay 25 is closed, the circuit for energizing and picking up relay 100 is complete, which in turn effects the maintaining of the circuit for energizing the relay 101 and also completes the circuit for energizing the all-clear lamp 29 by way of the wire 39, wire 50, switch 137, wire 107, wire 116, contact member 103 of relay 100, wire 77, all-clear lamp 29, wire 78 and battery return wire 3, thus giving an indication on the locomotive of the integrity condition of the control wires throughout the train.

It will now be apparent that if a fault, such as a break in either the application control wire 7 or the common return wire 8, or a short-circuit between the two said wires occurs, the circuit for energizing the rectifier 30 and the relay 31 is discontinued, thereby causing relay 31 to drop out and open contact member 32 and move contact member 111 to its down closed position. With contact member 111 of relay 31 in its down closed position, a circuit is completed for energizing the fault lamp 36 on the last car by way of car battery 15, wire 70, contact member 111, wire 74, fault lamp 36, wire 75, and wire 73 back to the battery, thus indicating on the rear car the mentioned faults. Also, as was previously mentioned, with the relay 31 deenergized, the relay 25 will drop out, thereby opening contact member 26 and interrupting the circuit for energizing the relay 100 which is of the slow release type. After a short time interval, the relay 100 will drop out after being deenergized, thereby opening contact member 102 of said relay and moving contact member 103 to its lower closed position. The opening of contact member 102 of relay 100, opens the plate supply circuit (previously described) of the electronic tube of the generator 18 thereby stopping the operation of said generator, and the moving of contact member 103 to its down closed position opens the circuit for energizing relay 101 and the all-clear lamp 29 and completes the circuit for energizing the fault lamp 28 by way of wire 39, wire 50, switch 137, wire 107, wire 116, contact member 103, wire 79, fault lamp 28 and wire 80 to the batttery return wire 3, thus indicating on the locomotive the above mentioned fault therein.

With the circuit for energizing relay 101 opened as just described, relay 101 will drop out after its slow release period, thereby causing the contact member 104 of said relay to move to its down closed position thus opening the previously described circuit for by-passing the resistor 121, and re-applying plate voltage to the electronic tube of the generator by recompleting the mentioned plate supply circuit. Thus, when the contact 104 of relay 101 moves to its down closed position as just described, the generator 18 will resume operation again, but due to the addition of resistor 121 in the heater circuit of the electronic tube of said generator, the heater 19 will begin to cool off and after a time interval of approximately fifteen seconds (adjusted by varying the resistance value of resistor 121) the heater 19 will have cooled below the limiting temperature of emission. Thus, according to the well-known electronic theory, the tube shown in Fig. 4 will cease to operate, thereby stopping the operation of the generator 18. If the mentioned faults correct themselves before the tube ceases to operate, the generator will continue to operate and the relays 31, 25, 101 and 100 will become reenergized to return the equipment to the condition existent before any fault occurred, the so-called normal condition. If, however, the mentioned faults fail to correct themselves before the generator 18 ceases to operate, the equipment can be restored to normal condition only by correcting the faults and operating either one or the other of the manual resets 105 and 106 as described previously.

If a fault occurs such as a break in the release control wire 9, or a short circuit between said release control wire 9 and the common return wire 8, it is apparent that the relay 25 will be deenergized, thus effecting the energizing of the fault lamp 28 on the locomotive, and, after a time interval, the generator 18 will cease to operate, as explained in the previous paragraph. However, if the said fault corrects itself before the generator 18 has ceased operation as explained in the previous paragraph, the equipment will automatically restore itself to meet previous described normal condition in a manner also previously described.

Application or release of the train brakes throughout the train by either the switch 10 or the back-up switch contact members 13 and 14 will have only minor effects if any at all, on the circuit checking equipment as was explained in the discussion of Fig. 1.

It will thus be seen, that the checking and signalling equipment shown in Fig. 2 provides a novel and adequate means for informing the locomotive engineer and the rear car trainman of the integrity or lack of integrity of the train brake control circuits in a manner similar to that described in connection with Fig. 1. However, the equipment shown in Fig. 2 provides an additional means for causing the checking apparatus to cease operation and give a continuous fault indication if a fault occurs that does not correct itself within a prescribed time interval, the reconditioning of said apparatus being accomplished only by correcting the said fault and operating either one of the two manual reset switches 105, 106.

*Description and operation of Fig. 4*

Only so much of the equipment in Fig. 4 will be described as differs from the equipment shown in Fig. 1 and like parts in the two equipments will be identified by the same reference numerals. Where parts of the equipment in Fig. 4 differ from the equipment in Fig. 2 these parts will be identified with reference numerals above the numeral 199.

The embodiment in Fig. 4 differs from that in Fig. 1 in having the combination of the generator 18 and the transformer 22 impress the high frequency voltage on the common return wire 8 instead of the application control wire 7 as was done in Figs. 1 and 2. The high frequency voltage is impressed on several parallel circuits, the first one including the common return wire 8, and on the last car a condenser 200, a rectifier 201, a wire 202, a fuse 203, a wire 204, application control wire 7 through the train, and on the locomotive a wire 205, a condenser 206, a wire 207, battery supply wire 6, wire 39, jumper wire 38 of switch 10, positive terminal wire 2, battery 1, battery return wire 3, and the common return wire 8 to the secondary winding 45 of transformer 22 in series with the common return wire 8; the second parallel circuit including the common return wire 8, a condenser 208, a rectifier 209, a wire 210, a fuse 211, a wire 212, release control wire 9 through the train, and on the locomotive, a wire 213, a condenser 214, a wire 215, battery supply wire 6, wire 39, jumper 38 of switch 10, positive terminal wire 2, battery 1, battery return wire 3, and the common return wire 8 to the secondary winding 45 of transformer 22 in series with the common return wire 8. With the said first parallel circuit energized, direct current voltage will be delivered from the rectifier 201 to a relay coil 216a of a relay 216 by way of wires 217 and 218, thereby energizing relay 216 to its picked-up position wherein a contact member 219 of said relay is closed. With the contact member 219 of relay 216 closed and the said second parallel circuit energized as described, the rectifier 209 will deliver a direct current to a relay coil 220a of a relay 220 by way of a wire 221, closed contact member 219, a wire 222, relay coil 220a and a wire 223, thereby energizing said relay to its picked-up position wherein a contact member 224 of said relay is closed, and a contact member 225 of said relay is in its upper closed position thus completing a circuit for energizing the all-clear lamp 35 in a manner similar to that described in connection with Fig. 1. With the contact member 224 of relay 220 closed, the said high frequency voltage is impressed upon a third parallel circuit including the common return wire 8, closed contact member 224 of relay 220, battery supply wire 6 through the train, the primary winding 57 of transformer 23, on the locomotive, in series with the battery supply wire 6, wire 39, jumper wire 38 of switch 10, positive terminal wire 2, battery 1, battery return wire 3, common return wire 8 and the secondary winding 45 of transformer 22 in series with the common return wire 8. With the primary winding 57 of transformer 23 energized, high frequency voltage, will be induced in the secondary winding 61 and thus across the rectifier 24 thereby energizing the relay 25 to its picked-up position by means of direct current delivered from rectifier 24 by way of wires 64 and 65. With relay 25 energized and picked-up the contact member 26 of said relay will be in its upper closed position thereby completing a circuit from the wire 39 for energizing the all-clear lamp 29 in a manner similar to that described in connection with Fig. 1. Thus, with no faults existing, both of the all-clear lamps 29 and 35 are energized as was described in Fig. 1.

It will now be apparent that energization of the all-clear lamp 29 on the locomotive is dependent on energization of the relay 25 which in turn is dependent on the energization of relay 220 on the last car and on the integrity of the common return wire 8 and the battery supply wire 6 extending through the train; and energization of relay 220 controls the energization of the all-clear lamp 35 on the last car and is dependent upon the energization of relay 216 and upon the integrity of the release and application control wires 9 and 7 extending through the train. The energization of relay 216 is dependent upon the integrity of the application control wire 7 and the common return wire 8. Thus, if a fault such as a break in either the application control wire 7 or the common return wire 8 or a short circuit between the two said wires occurs, the circuit for energizing the rectifier 201 and thus the relay 216 will be interrupted, causing relay 216, relay 220 and relay 25 to drop-out, thereby moving the contact member 225 of relay 220 and contact member 26 or relay 25 to their respective down closed positions to complete circuits described in connection with Fig. 1 for energizing the fault lamps 36 and 28 respectively to indicate said faults. If a fault such as a break in the release control wire 9 or a short circuit between the release control wire 9 and the common return wire 8 occurs, the circuit for energizing rectifier 209 and thus the relay 220 will be interrupted thereby effecting energization of the fault lamps 28 and 36 as just described to indicate said fault. If a fault such as break in the battery supply wire 6 occurs, the circuit for energizing the primary winding 57 of the transformer 23 and the relay 25 will be interrupted thereby effecting energization of the fault lamp 28 as previously explained to indicate said fault.

It will thus be seen, that the checking and signalling equipment shown in Fig. 4 provides a novel and adequate means for informing the locomotive engineer and the rear car trainman of the integrity or lack of integrity of the train control circuits in a manner similar to that shown in Fig. 1 with modified circuit connections.

Having now described my invention, what I claim as new and desire to secure by Letters Patent, is:

1. Apparatus for checking the integrity of a control circuit and of a source of direct current adapted to be connected to and disconnected from said control circuit for energizing and deenergizing same, said apparatus comprising a source of alternating current electrically interposed in series in said control circuit for generating flow of alternating current therethrough, and condenser means connecting said source of direct current to said control circuit to provide a path for flow of alternating current through said source of direct current and through said control circuit to verify the integrity thereof whether or not said source of direct current is connected to said control circuit for energizing same.

2. Apparatus for checking the integrity of a control system which includes a pair of control wires extending between two locations and a source of direct current adapted for energizing connection with said wires to energize same, said apparatus comprising a source of alternating current electrically interposed in series in one of said control wires for generating flow of alternating current therethrough, a first alternating-current-conducting connection, including in series a condenser, joining said control wires at one of said locations, and a second alternating-current-conducting connection, including a condenser in series with said source of direct current, joining said control wires at the other of said locations, the first and second alternating-current-conducting connections providing a path for flow of alternating current through said source of direct current and through said control wires from location to location to verify integrity thereof, independently of said energizing connection.

3. Apparatus for checking the integrity of a control system which includes a pair of control wires extending between two locations and a source of direct current adapted for energizing connection with said wires to energize same, said apparatus comprising an output transformer having a secondary winding electrically interposed in series in one of said control wires and also having a primary winding, a source of alternating current connected to generate alternating current in said primary winding, a first alternating-current-conducting connection, including in series a condenser, joining said control wires at one of said locations, and a second alternating-current-conducting connection, including a condenser in series with said source of direct current, joining said control wires at the other of said locations, the first and second alternating-current-conducting connections providing a path for flow of alternating current through said source of direct current and through said control wires to verify integrity thereof, independently of said energizing connection.

4. Apparatus for checking the integrity of a control system which includes a pair of control wires extending between two locations, a plurality of magnet coils intermediate said two locations connected in parallel between said control wires to receive energizing current thereby, and a source of direct current adapted for energizing connection with said control wires to energize said magnet coils, said apparatus comprising an output transformer having a secondary winding electrically interposed in series in one of said control wires and also having a primary winding, a source of alternating current connected to generate in said primary winding alternating current of a frequently between 2000 and 4000 cycles per second, a first alternating-current-conducting connection, including in series a condenser, joining said control wires at one of said locations, and a second alternating-current-conducting connection, including a condenser in series with said source of direct current, joining said control wires at the other of said locations, the first and second alternating-current-conducting connections enabling flow of alternating current through said source of direct current and through said control wires, independently of said energizing connection, to verify thereof, while the alternating current flowing in said control wires is prevented from flowing through said magnet coils in any substantial degree by virtue of the degree of frequency thereof.

5. Apparatus for checking the integrity of a control system which includes three control wires and a source of direct current adapted for energizing connection with said control wires, said apparatus comprising a source of alternating current electrically interposed in series in one of said control wires for generating flow of alternating current therethrough, alternating-current-conducting means connecting said wires one with the other and with said source of direct current to provide a path for flow of alternating current through said system including said source of direct current independently of said energizing connection, and means responsive to flow of alternating current through said system to effect signal indication of system integrity.

6. Apparatus for checking the integrity of a control system which includes three control wires extending between two locations and a source of direct current adapted for energizing connection with said wires, said apparatus comprising a source of alternating current electrically interposed in series in one of said control wires for generating flow of alternating current therethrough, a first alternating-current-conducting connection at one of said locations, including in series a condenser, joining the control wire in which the alternating current generator is interposed with one of the other two control wires, means at the same location responsive to flow of alternating current through said first alternating-current-conducting connection to establish flow of alternating current through the remaining of the three control wires, second alternating-current-conducting means at the other of said locations, including a condenser in series with said source of direct current, joining the control wire in which the alternating current generator is interposed with one of the other two control wires, and third alternating-current conducting means at the same location, including a condenser in series with said source of direct current, joining the control wire in which the alternating current generator is interposed with the remaining of the three control wires.

7. Apparatus for checking the integrity of a control system which includes a source of direct current having a positive terminal and a negative terminal and, extending between first and second locations, first and second control wires adapted for energizing connection with said positive terminal and a return wire constantly connected to said negative terminal, said apparatus comprising a source of alternating current electrically interposed in the first control wire to generate alternating current therein, a first alternating-current-conducting connection at the first location, including a condenser in series therein, joining the first control wire with said return wire, means responsive to flow of alternating current through said first alternating-current-conducting connection to establish a second alternating-current-conducting connection also at said first location, including a condenser in series therein, joining the first control wire with the second control wire, a third alternating-current-conducting connection at the second location, including a condenser in series therein, joining the first control wire with said positive terminal, a fourth alternating-current-conducting connection at the second location, including a condenser in series therein, joining the second control wire with said positive terminal, and means at the second location responsive to flow of alternating current through the second control wire to effect signal indication of the integrity of said system.

8. Apparatus for checking the integrity of a control system which includes a source of direct current having a positive terminal and a negative terminal, and, extending between first and second locations, first and second control wires adapted for energizing connection with said positive terminal and a return wire constantly connected to said negative terminal, said apparatus comprising an output transformer having a secondary winding electrically interposed in series in the first control wire and also having a primary winding, alternating current generator means having an operative connection with the primary winding of said output transformer, a first alternating-current-conducting connection at the first location, including a condenser in series therein, joining the first control wire with said return wire, means responsive to flow of alternating current through said first alternating-current-conducting connection to establish a second alternating-current-conducting connection at the first location, including a condenser in series therein, joining the second control wire with the first control wire, a third alternating-current-conducting connection at the second location, including a condenser in series therein, joining said first control wire with said positive terminal independently of said energizing connection, a fourth alternating-current-conducting connection at the second location, including a condenser in series therein, joining the second control wire with said positive terminal independently of said supply connection, an input transformer at the second location having a primary winding electrically interposed in series in the second control wire and also having a secondary winding, signal means to sensibly indicate integrity of said control system, and relay means responsive to current output from the secondary winding of said input transformer to control operation of said signal means.

9. Apparatus for checking the integrity of a control system which includes a source of direct current at one control station having a positive terminal and a negative terminal, and, extending from said one control station to a second control station, first and second control wires adapted for energizing connection with said positive terminal, a supply wire to conduct direct current from said one control station to said second control station and a return wire constantly connected to said negative terminal, said apparatus comprising an output transformer having a secondary winding electrically interposed in series in the first control wire and also having a primary winding, an alternating current generator operable to generate alternating current in said primary winding, a first alternating-current-conducting connection at said second control station, including a condenser in series therein, joining the first control wire with said return wire, means responsive to flow of alternating current through said first alternating-current-conducting connection to establish a second alternating-current-conducting connection at said second control station, including a condenser in series therein, joining the second control wire with the first control wire, a third alternating-current-conducting connection at said one control station, including a condenser in series therein, joining said first control wire with said positive terminal independently of said energizing connection, a fourth alternating-current-conducting connection at said one control station, including a condenser in series therein, joining the second control wire with said positive terminal independently of said energizing connection, an input transformer at said one location having a primary winding electrically interposed in series in the second control wire and also having a secondary winding, first signal means at said one control station to sensibly indicate integrity of said control system, first relay means at said one control station responsive to current generated in the secondary winding of said input transformer to control operation of said first signal means, and to control a supply connection between said supply wire and said positive terminal, second signal means at said second control station to sensibly indicate integrity of said control system, a fifth alternating-current-conducting connection at said second control station joining said supply wire with said return wire, and second relay means responsive to flow of alternating current through the last mentioned connection to control operation of said second signal means.

10. In combination with a source of direct current and a control wire, an oscillator tube including plate means and heater means responsive to supply of direct current from said source to effect flow of high-frequency-circuit-integrity-checking current from said tube through said control circuit, first relay means operative in response to termination in flow of checking current through said control circuit for a certain period of time to disestablish connection between said plate means and said source, and second relay means responsive to operation of said first relay means after a certain period of time to re-establish connection between said plate means and said source and to effect a reduction in current from said source to said heater means.

11. The combination as set forth in claim 10, including reset switch means operable to establish full rate of current from said source to said heater means independently of said second relay means.

12. The combination as set forth in claim 10, including fault-indicating signal means rendered effective by operation of said first relay means.

13. In combination with a source of direct current and a control circuit, an oscillator tube including plate means and heater means, said tube being operable by supply of direct current to said plate means and heater means to produce flow of high-frequency circuit-integrity-checking current through said control circuit, current-reducing means constantly connecting said heater means with said source to reduce current flowing through said heater means below the tube emission value, first relay contact means movable to first and second positions to establish connections selectively between said source and said plate means or between said source and said heater means in by-pass of said current limiting means, respectively, first relay coil means energizable and deenergizable to actuate said first contact means to its first and second positions, respectively, second contact means movable to first and second positions to establish and disestablish, respectively, a connection between said source and said plate means, third contact means movable to first and second positions to establish and disestablish, respectively, connection between said source and said first relay coil means, second relay coil means energizable and deenergizable to actuate the second and third contact means to their first and second positions, respectively, fourth contact means movable to closed and open positions to connect and disconnect, respectively, said second relay coil means to and from said source, and third relay coil means energized and deenergized responsively to flow and termination of flow, respectively, of checking current through said control circuit to actuate said fourth contact means to its open and closed positions, respectively.

14. The combination as set forth in claim 13, including timing means associated with the first and second relay coil means to delay deenergization thereof for a certain period of time.

15. The combination as set forth in claim 13, including no-fault and fault indicating signal means rendered effective by movement of said third contact means to its first and second positions, respectively.

16. The combination as set forth in claim 13, including reset switch means operable manually to connect said source to said third relay coil means in by-pass of said fourth contact means.

17. The combination as set forth in claim 13, including reset switch means operable manually to connect said source to said heater means in by-pass of said current limiting means.

18. Apparatus for checking the integrity of a control system which includes a source of direct current, at one control station, having a positive terminal and a negative terminal, and, extending between said one control station and a second control station, two control wires adapted for energizing connection with said source of direct current, a supply wire connected to said positive terminal and a return wire connected to said negative terminal, said apparatus comprising an alternating current generator adapted for operative connection with said return wire to generate flow of alternating current therein, a first pair of condenser means connecting said return wire with said two control wires, respectively, at said second control station, means responsive to flow of alternating current through both of said first pair of condenser means to establish an alternating-current-conducting connection, including a condenser in series therein, between said return wire and said supply wire and responsive to interruption in flow of alternating current through either of said first pair of condenser means to disestablish said alternating-current-conducting connection, a second pair of condenser means interconnecting said supply wire with said two control wires, respectively, at said one control station, signal means at said one control station operable to effect sensible indication of the integrity of said control system, and means responsive to flow of alternating current through said supply wire to control said signal means.

19. The combination as set forth in claim 18, including second signal means at said second control station operable to effect sensible indication of the integrity of said control system, and means responsive to flow of alternating current through said first pair of condenser means to control operation of said second signal means.

References Cited in the file of this patent

UNITED STATES PATENTS

| | | |
|---|---|---|
| 1,995,272 | Brixner | Mar. 19, 1935 |
| 2,072,079 | Blodgett | Mar. 2, 1937 |
| 2,082,143 | Bossart | June 1, 1937 |
| 2,276,706 | Sorensen | Mar. 17, 1942 |
| 2,479,548 | Young | Aug. 16, 1949 |
| 2,605,334 | Hines | July 29, 1952 |